(12) United States Patent
Sharma et al.

(10) Patent No.: US 11,467,862 B2
(45) Date of Patent: Oct. 11, 2022

(54) APPLICATION CHANGE NOTIFICATIONS BASED ON APPLICATION LOGS

(71) Applicant: VMWARE, INC., Palo Alto, CA (US)

(72) Inventors: Gaurav Sharma, Pune (IN); Jagdish Shinde, Pune (IN); Ravi Singhal, Pune (IN)

(73) Assignee: VMWARE, INC., Palo Alto, CA (US)

( * ) Notice: Subject to any disclaimer, the term of this patent is extended or adjusted under 35 U.S.C. 154(b) by 383 days.

(21) Appl. No.: 16/524,201

(22) Filed: Jul. 29, 2019

(65) Prior Publication Data

US 2021/0026676 A1 Jan. 28, 2021

(30) Foreign Application Priority Data

Jul. 22, 2019 (IN) .............................. 201941029442

(51) Int. Cl.
| | |
|---|---|
| *G06F 9/455* | (2018.01) |
| *G06F 9/54* | (2006.01) |
| *G06F 16/18* | (2019.01) |
| *G06F 16/903* | (2019.01) |

(52) U.S. Cl.
CPC .......... *G06F 9/45558* (2013.01); *G06F 9/542* (2013.01); *G06F 16/1805* (2019.01); *G06F 16/90335* (2019.01)

(58) Field of Classification Search
CPC ............. G06F 11/3006; G06F 16/1805; G06F 16/90335; G06F 16/2379; G06F 16/903; G06F 9/45558; G06F 9/542; G06F 11/301; G06F 11/3075; G06F 11/3079; G06F 11/2358

See application file for complete search history.

(56) References Cited

U.S. PATENT DOCUMENTS

| | | | |
|---|---|---|---|
| 2001/0044705 A1* | 11/2001 | Vardi | G06F 11/3433 702/186 |
| 2002/0015403 A1* | 2/2002 | McConnell | H04L 29/06 370/352 |
| 2002/0035559 A1* | 3/2002 | Crowe | G06F 16/24564 |
| 2003/0061346 A1* | 3/2003 | Pekary | H04L 69/40 709/239 |
| 2003/0229686 A1* | 12/2003 | Kortright | H04L 41/0856 709/220 |
| 2004/0215757 A1* | 10/2004 | Butler | H04L 67/52 709/223 |
| 2006/0020616 A1* | 1/2006 | Hardy | G06F 16/316 |
| 2006/0117091 A1* | 6/2006 | Justin | G06F 11/3476 709/217 |

(Continued)

*Primary Examiner* — Tuan C Dao

(57) ABSTRACT

Techniques for generating change notifications associated with applications based on application logs are disclosed. In one embodiment, a system may include a log analyzer to receive application logs generated by the applications running in a computing environment and analyze the received application logs to parse information about the applications. Further, the system may include a change detection unit communicatively coupled to the log analyzer to generate a change notification indicating that a change has been occurred to an application running on a compute node in the computing environment using the parsed information and send the change notification indicating the changed application to a subscriber.

21 Claims, 4 Drawing Sheets

(56) References Cited

U.S. PATENT DOCUMENTS

| | | | | |
|---|---|---|---|---|
| 2006/0242239 A1* | 10/2006 | Morishima | ........... | H04L 12/185 709/204 |
| 2006/0277162 A1* | 12/2006 | Smith | ..................... | G06F 16/24 |
| 2010/0274768 A1* | 10/2010 | Wang | ...................... | G06F 16/27 711/135 |
| 2011/0106807 A1* | 5/2011 | Srihari | .................. | G06F 16/288 707/E17.046 |
| 2014/0157288 A1* | 6/2014 | Wong | ................. | G06F 11/3476 719/318 |
| 2014/0235179 A1* | 8/2014 | George | ................ | H04W 24/08 455/67.14 |
| 2016/0094477 A1* | 3/2016 | Bai | ...................... | H04L 47/786 709/226 |

* cited by examiner

APPLICATION CHANGE NOTIFICATIONS BASED ON APPLICATION LOGS

RELATED APPLICATIONS

Benefit is claimed under 35 U.S.C. 119(a)-(d) to Foreign Application Serial No. 201941029442 filed in India entitled "APPLICATION CHANGE NOTIFICATIONS BASED ON APPLICATION LOGS", on Jul. 22, 2019, by VMWARE, INC., which is herein incorporated in its entirety by reference for all purposes.

TECHNICAL FIELD

The present disclosure relates to computing environments, and more particularly to methods, techniques, and systems for generating application change notifications based on application logs in the computing environments.

BACKGROUND

In computing environments such as networked computing environments, cloud computing environments, virtualized environments, and the like applications and processes may be comprised of multiple components operating on multiple devices. This may be true particularly for enterprises that might be spread across multiple geographical locations. For example, a customer relationship management (CRM) system may utilize components such as a database, a web server, and a user application, each executing on a different compute node (e.g., a physical machine, a virtual machine, a container, and/or the like) in the computing environment. The compute nodes may be connected through a network.

Figure 1:
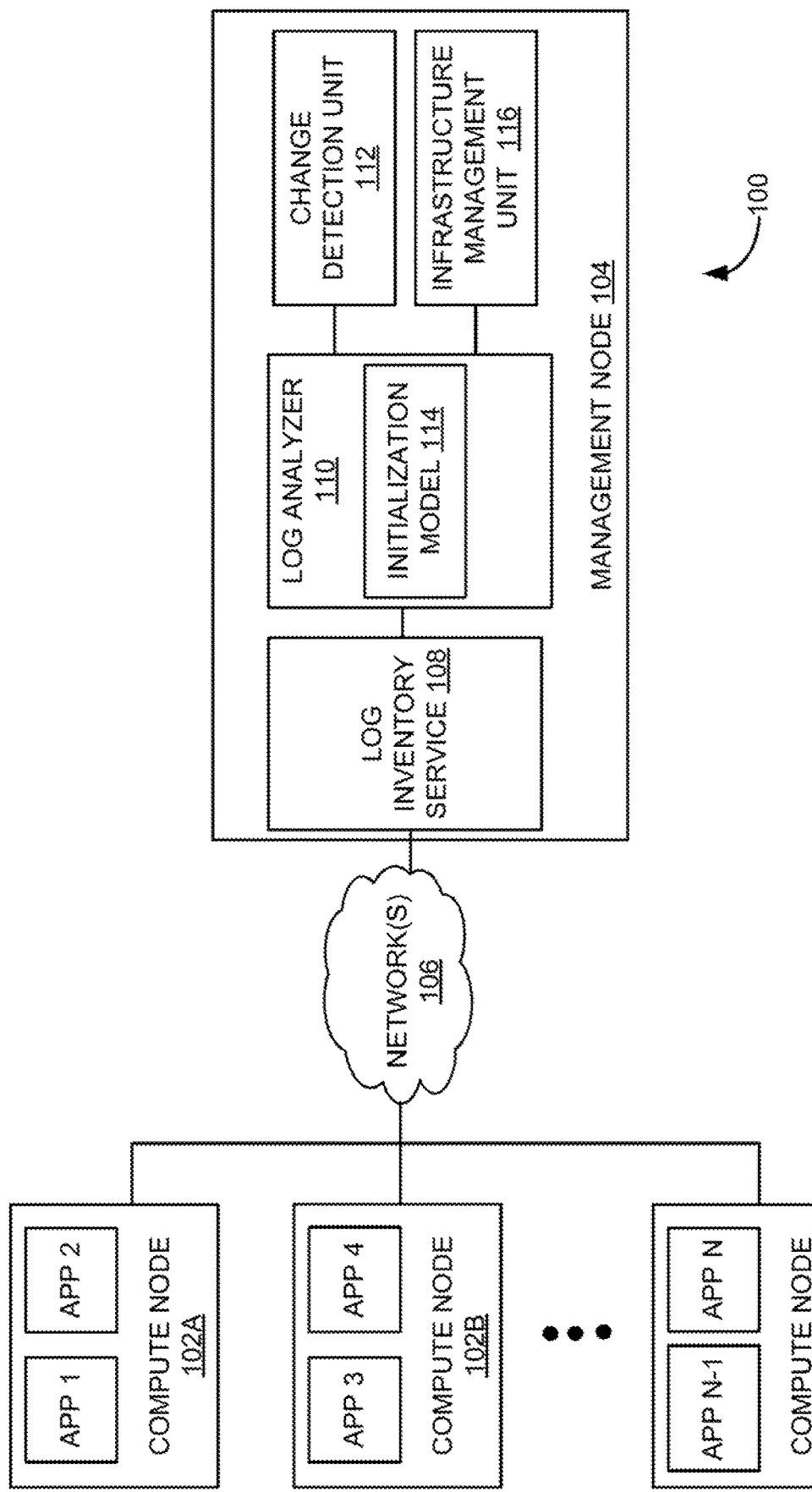
FIG. 1 is a system view of an example computing environment illustrating a change detection unit to generate a change notification associated with an application based on application logs.

The drawings described herein are for illustration purposes only and are not intended to limit the scope of the present subject matter in any way.

DETAILED DESCRIPTION

Embodiments described herein may provide an enhanced computer-based and network-based method, technique, and system for generating a change notification associated with an application using application logs. A change notification may indicate that a change has been occurred to the application running in a computing environment. The computing environment may be a networked computing environment such as an enterprise computing environment, a cloud computing environment, a virtualized environment, a cross-cloud computing environment, or the like. For example, monitoring and reporting of change or drift happening in the computing environment (e.g., a data center) with respect to the applications may be performed for compliance reasons. With evolving network growth and matured computation virtualization techniques, enterprise applications have become more complex. In such computing environments, monitoring the applications to determine changes in the applications may be difficult because of the scale and complexity involved in such infrastructures.

Some methods for monitoring applications to determine changes may include a polling process. In the polling process, data associated with an application may be fetched via supported application program interfaces (APIs) and command-line interfaces (CLIs). Further, the fetched data may be analyzed to determine a change in the application. For example, the applications like network virtualization and security applications (e.g., VMware® NSX-v and NSX-t) may not have an in-built change-based push notification mechanism. In such applications, the polling process may be used. However, the APIs and CLIs may not be designed for frequent polling and may bring the functionality down if used frequently.

Further, polling process may include frequent polling of the application to fetch information (e.g., not just information associated with a change) even though no change has occurred in the application between polling cycles. Thus, a load of a server hosting the application may be increased. In addition, the polling process may work when the number of applications and their operation transactions are significantly less. However, the polling process may fall short when the number of applications configured in the data center is significantly more. Furthermore, designing and implementing real-time change-based notification for the applications may consume additional computing resources and significantly expensive.

Examples described herein may generate change notifications associated with applications using application logs/log files generated by the applications. The applications running inside a compute node may have associated log files. Such log files may have information logged about the application instantiation, operation transaction information of the application, and the like.

Examples described herein may receive application logs generated by the applications running in a computing environment and analyze the received application logs to parse information about the applications. Using the parsed information, a change notification may be generated indicating that a change has been occurred to an application running on a compute node in the computing environment. Further, the change notification indicating the changed application may be sent to a subscriber. In one example, the subscriber may manage the application based on the change notification. Thus, examples described herein may provide the change notifications to manage the applications efficiently without frequently polling via the APIs and CLIs.

System Overview and Examples of Operation

FIG. 1 is a system view of an example computing environment 100 illustrating a change detection unit 112 to generate a change notification associated with an application (e.g., app 1 to app N) based on application logs. As shown in FIG. 1, computing environment 100 may include multiple compute nodes 102A-N and a management node 104 that is in communication with compute nodes 102A-N over one or more networks 106. Each compute node 102 may refer to a computing device or computer program (i.e., executing on a computing device) that requests services from management node 104.

As shown in FIG. 1, computing nodes 102A-102N may refer to management nodes executing a respective one of centralized management applications app 1 to app N, which can be dependent on each other. In one example, the management nodes may be distributed across multiple sites (e.g., separate geographical locations). Each centralized management application app 1 to app N may be a centralized management service to centrally manage virtual machines and physical servers in computing environment 100. In some systems with distributed management, the host computing systems may be statically allocated among the management nodes. Example centralized management applications app 1 to app N may be a part of vCenter Server™ and vSphere® program products, which are commercially available from VMware. Example centralized management applications app 1 to app N may include virtual machine provisioning service (e.g., to guide and automate the provisioning of virtual machines and their resources), resources and virtual machine inventory management service (e.g., to organize virtual machines and resources in the virtual environment and facilitates their management), alarms and event management service (e.g., to track and warn users on potential resource overuse or event conditions), and the like.

Example compute nodes 102A-N may include, but not limited to, physical computing devices, virtual machines, containers, or the like. The virtual machines, in some embodiments, may operate with their own guest operating systems on a physical computing device using resources of the physical computing device virtualized by virtualization software (e.g., a hypervisor, a virtual machine monitor, and the like). A container is a data computer node that runs on top of a host OS without the need for a hypervisor or separate OS. Management node 104 may refer to a computing device or computer program (i.e., executing on a computing device) that provides some service to compute nodes 102A-N or applications (e.g., app 1 to app N) executing on compute nodes 102A-N.

Compute nodes 102A-N and management node 104 may communicate over communication links (e.g., networks 106). Communication is according to a protocol, which may be a message-based protocol. Example network 106 can be a managed Internet protocol (IP) network administered by a service provider. For example, network 106 may be implemented using wireless protocols and technologies, such as Wi-Fi, WiMAX, and the like. In other examples, network 106 can also be a packet-switched network such as a local area network, wide area network, metropolitan area network, Internet network, or other similar type of network environment. In yet other examples, network 106 may be a fixed wireless network, a wireless local area network (LAN), a wireless wide area network (WAN), a personal area network (PAN), a virtual private network (VPN), intranet or other suitable network system and includes equipment for receiving and transmitting signals. Network 106 can also have a hard-wired connection to compute nodes 102A-N.

In some examples, compute nodes 102A-N may include processing resources/processors and memories, respectively. Example processor can be any custom made or commercially available processor, a central processing unit (CPU), an auxiliary processor among several processors associated with compute nodes 102A-N, a semiconductor-based microprocessor (in the form of a microchip or chip set, for example), a macroprocessor, or generally any device for executing computer-readable program code. Example memory may be a computer-readable storage medium. In some examples, memory can have a distributed architecture, where various components are situated remote from one another, but can be accessed by compute nodes 102A-N. Processors may be configured to execute software stored within associated one of memories, to communicate data to and from the memory, and to generally control operations of compute nodes 102A-N pursuant to the computer-readable program code. Example non-transitory computer readable medium is an electronic, magnetic, optical, or other physical device or means that can contain or store a computer program for use by or in connection with a computer related system. The computer-readable program code in the non-transitory computer-readable medium may include one or more separate programs and may be in the form of a source program, executable program (object code), script, or any other entity comprising a set of instructions to be performed.

Examples described in FIG. 1 may depict management node 104 in communication with multiple compute nodes 102A-N, however, in some examples, a group of management nodes or a cluster of management nodes can communicate with multiple compute nodes 102A-N over one or more networks 106 to provide services to compute nodes 102A-N. Further, numerous types of applications may be supported on computing environment 100. For example, computing environment 100 may include a plurality of applications (i.e., app 1 to app n) running on corresponding compute nodes 102A-N. For example, the applications can be, but are not limited to, management applications (e.g., VMware vCenter®) network virtualization and security applications (e.g., VMware NSX-v and NSX-t). The applications may generate application logs including information about the activities performed by the applications to facilitate technical support and troubleshooting of the applications. The application logs may be sent to management node 104 for further analysis.

Management node 104 may include a log analyzer 110 and change detection unit 112 communicatively coupled to log analyzer 110. During operation, log analyzer 110 may receive application logs generated by applications (app 1 to app n) running on compute nodes 102A-N in computing environment 100. In one example, applications (app 1 to app n) may run in a single cloud or distributed across multiple clouds. In some examples, log analyzer 110 may receive application logs from a log inventory service 108, for instance, residing in management node 104. In one example, log inventory service 108 may be used to index the application logs generated by applications (app 1 to app n).

Further, log analyzer 110 may analyze the received application logs to parse information about applications (app 1 to app n). In one example, log analyzer 110 may analyze the received application logs using context aware log parsing queries to parse information about applications (app 1 to app n). For example, log analyzer 110 may analyze the received application logs using an initialization model 114 to parse information about the plurality of applications. Initialization model 114 may be trained on input words and/or strings of words using machine learning and natural language processing methods. Example input words and/or strings of words are selected from historical application logs.

Further, log analyzer 110 may generate an alarm when the parsed information matches with a context aware log parsing query. The alarm may be sent to change detection unit 112 by means of webhook alert, for instance. Furthermore, change detection unit 112 may generate a change notification indicating that a change has been occurred to an application (e.g., app 1) running on a compute node (e.g., 102A) in computing environment 100 using the parsed information. Upon generating the change notification, change detection unit 112 may send the change notification indicating the changed application to a subscriber. In one example, change detection unit 112 may receive the generated alarm from log analyzer 110 through a notification service and transform the generated alarm into a change notification message. Further, change detection unit 112 may place the change notification message on a notification bus for consumption by the subscriber. Example change notification message format may be:

```
{
    "type":"nsxt.nsgroup",
    "timestamp":1515061155,
    "source":"172.16.1.3",
    "sourceType":"NSXT_MANAGER"
    "payloads":[{ },{ }]
}
```

Further, management node 104 may include an infrastructure management unit 116 to extract a change associated with an individual component of the application upon receiving the change notification. In one example, the change may correspond to one of create, read, update, and delete (CRUD) changes. Further, infrastructure management unit 116 may retrieve data associated with the individual component corresponding to the change and manage application (e.g., app 1) in computing environment 100 using the retrieved data.

In some examples, upon receiving the change notification message, the subscriber may monitor and/or manage the application based on the change in the application. In one example, the application may be monitored for health, connections, and/or resource usage. Example resource usage may be associated with at least one resource such as a processor, a memory, a network hardware, a bandwidth, or the like.

In one example, log analyzer 110, change detection unit 112, and infrastructure management unit 116 may be implemented as engines or modules comprising any combination of hardware, firmware, programming, or a combination thereof to implement the functionalities described herein. Management node 104 can be a service process in the management application or can be an appliance running in the data center to cater multiple management applications in a cloud-based environment. For example, management applications may be a network virtualization and security software (NSX®) that is offered by VMware. Management application may be hosted or deployed in a physical server, VM, or container.

In some examples, the functionalities described herein, in relation to instructions to implement functions of log analyzer 110, change detection unit 112, infrastructure management unit 116, and any additional instructions described herein in relation to the storage medium, may be implemented as engines or modules comprising any combination of hardware and programming to implement the functionalities of the modules or engines described herein. The functions of log analyzer 110, change detection unit 112, and infrastructure management unit 116 may also be implemented by a respective processor. In examples described herein, the processor may include, for example, one processor or multiple processors included in a single device or distributed across multiple devices.

Figure 2:
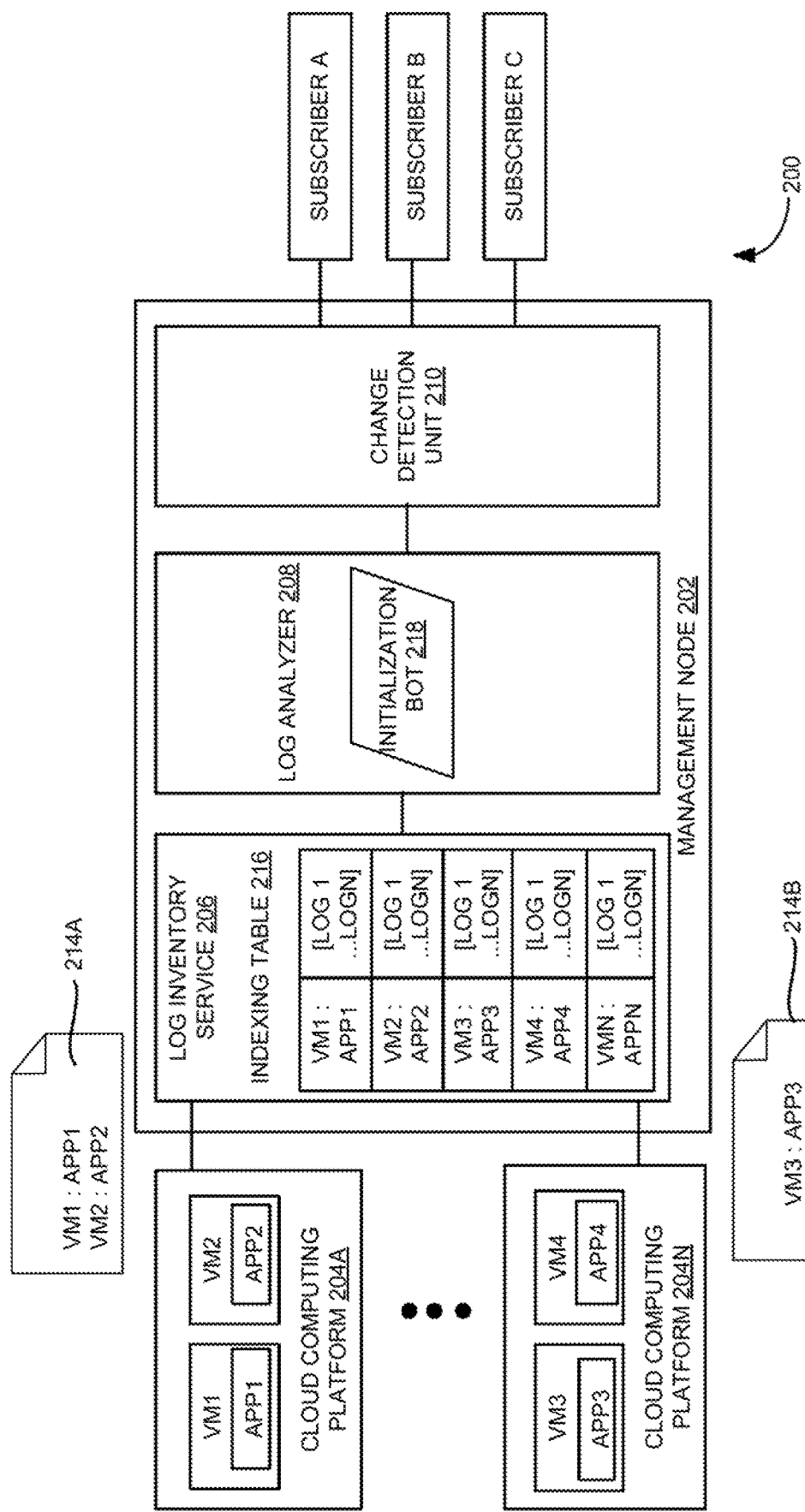
FIG. 2 is a block diagram of an example system for generating an application change notification through application logs in a multi-cloud environment.

FIG. 2 is a block diagram of an example system 200 for generating an application change notification through application logs in a multi-cloud environment. As shown in FIG. 2, system 200 may include a management node 202 and cloud computing environments (i.e., cloud computing platforms 204A-N) that are in communication with management node 202. Management node 202 may refer to a computing device or computer program (i.e., executing on the computing device), that provides some service to compute nodes (e.g., VM1-VM4) of cloud computing platforms 204A-N. Management node 202 may connect to cloud computing platforms 204A-N either directly or over a network (e.g., over a local-area network, wide-area network, wireless network, or the like).

As shown in FIG. 2, system 200 may support multiple cloud computing platforms 204A-N, available to multiple enterprises in single-tenant and multi-tenant configurations. In one example, cloud computing platforms 204A-N may be provided by different cloud service providers. For example, each cloud computing platform 204 may include, but not limited to, Amazon Web Services (AWS), Google Cloud Platform, Windows Azure, OpenStack, or any other cloud computing platform. In some examples, VMs may be created and run in the AWS such as Amazon Elastic Compute Cloud (EC2).

Each cloud computing platform 204 may be operated by a cloud computing service provider and exposed as a service available to tenants (e.g., account holders), such as enterprises. In some examples, cloud computing platform 204 may be configured to dynamically provide an enterprise or users with one or more virtual data centers in which a user may provision VMs, deploy multi-tier applications on VMs, and/or execute workloads. Cloud computing platform 204 may include an infrastructure platform upon which a cloud computing environment may be executed. The term "multi-tier application" may refer to an application in which different functions of the application are logically separated (e.g., using different VMs and/or VM clusters) to handle different tasks or functions of the application.

As shown in FIG. 2, VMs (i.e., VM1 to VM4) may be deployed within cloud computing platforms 204A-N to provide infrastructure services, IT management services, and other infrastructure-related functions to tenants. Further, VMs (VM1 to VM4) running on different cloud computing platforms 204A-N may be centrally managed by management node 202. Even though FIG. 2 depicts two VMs running in each cloud computing platform 204, in some examples, multiple VMs can be deployed in each cloud computing platform 204. In other examples, containers can also be deployed in each cloud computing platform 204. Further, the VMs and/or containers may execute applications running therein.

Examples described herein can also be implemented in a hybrid computing environment, which may include several clusters of individual physical machines with each physical machine supporting hundreds of virtual machines (VMs) or containers. In the hybrid computing environments, each application is an executable computer software running on either physical machines, containers, or virtual machines.

Examples described herein can also be implemented in cross cloud computing platforms, where different VMs or containers may run on various types/flavors/versions of OS. The format and content of the application logs may be determined by a developer of the application. For example, an application log may refer to a file of events that are logged by an application (i.e., software application). The application log may include errors, informational events, warnings, and/or the like.

In one example, management node 202 may include a log inventory service 206, a log analyzer 208, and a change detection unit 210. As shown in FIG. 2, application logs 214A and 214B including the relevant communication information may be collected and indexed in log inventory service 206. Log inventory service 206 may provide subscribed endpoints to index application logs 214A and 214B generated by applications (app 1 to app 4). Log inventory service 206 may maintain an indexing table 216, which includes a hash-based data structure where each entry associated with application logs 214A and 214B may maintain a resource key to identify a host application and a value as a list of log files. An example data structure of the resource key may include:

| Resource UUID | Resource identifiers | Resource location | Application name | Application identifiers | Resource name | Custom properties |
| --- | --- | --- | --- | --- | --- | --- |

Further, log analyzer 208 may loop through the application logs from log inventory service 206 and parse the relevant information about the applications. In one example, log analyzer 208 may use a trained initialization bot (I-Bot) 218 to look for the application initialization, instantiation, and connection messages such as "listening on http://<fqdn>:<port>", "New Node added", "Starting service", and the like. The terms "initialization bot" and "initialization model" are used interchangeably throughout the document. Once initialization bot 218 is trained, initialization bot 218 can scan the real-time application logs to detect the presence of the applications. The training of initialization bot 218 may be continued through machine learning and natural language processing methods, which can improve accuracy to investigate and parse the relevant data over time.

During operation, log analyzer 208 may utilize initialization bot 218 to analyze the received application logs to parse information about the applications (app 1 to app 4). Example initialization bot 218 may be trained on input words and/or strings of words using machine learning and natural language processing methods. For example, the input words and/or the strings of words are selected from historical application logs.

Further, change detection unit 210 may generate a change notification indicating that a change has been occurred to an application (app 1) using the parsed information. Upon generating the change notification, the change notification indicating the changed application may be sent to corresponding one or more subscribers (e.g., subscribers A to C). In one example, change detection unit 210 may generate the change notification indicating that a change has been occurred to an individual component of application (app 1) using the parsed information about applications (app 1 to app 4). Change detection unit 210 may build a notification bus to push the change notification to the subscribers (e.g., subscribers A to C) of the notification bus.

Log analyzer 208 and change detection unit 210 may be implemented as engines or modules comprising any combination of hardware, firmware, programming, or a combination thereof to implement the functionalities described herein.

Examples described herein may provide the change notification as a service, which can be used by any application that can write into logs. Further, examples described herein may be implemented in client-server systems. For example, management node may be a vRealize™ Network Insight that is offered by VMware. Examples described herein can be implemented in software as a service (SAAS), where the server communicating with multiple compute nodes (i.e., clients/agents/probes/slaves) could receive log files generated by the applications running on the multiple compute nodes.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 3:
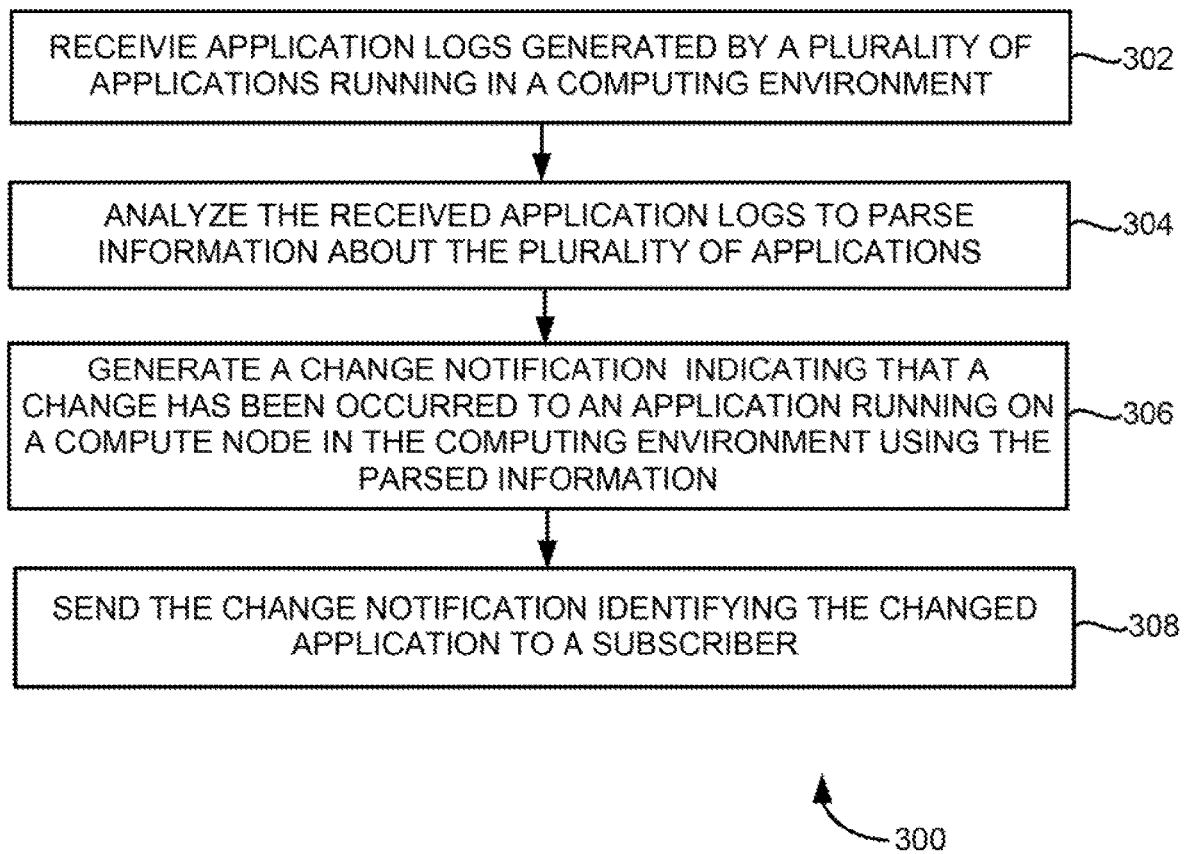
FIG. 3 is an example flow diagram illustrating generation of a change notification associated with an application running on a compute node in a computing environment using application logs.

FIG. 3 is an example flow diagram 300 illustrating generation of a change notification associated with an application running on a compute node in a computing environment using application logs. It should be understood that the process depicted in FIG. 3 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 302, application logs generated by a plurality of applications running in a computing environment may be received by a log analyzer. In one example, the application logs generated by the plurality of applications may be indexed in a log inventory service. Further, the application logs are received by the log analyzer from the log inventory service. The plurality of applications may run on compute nodes in a single cloud or distributed across multiple clouds. Example compute node may include a virtual machine, a container, or a physical machine (e.g., physical server).

At 304, the received application logs may be analyzed by the log analyzer to parse information about the plurality of applications. In one example, the received application logs may be analyzed using context aware log parsing queries to parse information about the plurality of applications. Further, an alarm may be generated by the log analyzer when the parsed information matches with a context aware log parsing query.

For example, the application logs generated by the plurality of applications may be indexed in a log inventory service and the log analyzer may receive application logs from the log inventory service. In one example, analyzing the received application logs may include analyzing the received application logs using an initialization model to parse information about the plurality of applications. Example initialization model may be trained on input words and/or strings of words using machine learning and natural language processing methods, and wherein the input words and/or the strings of words are selected from historical application logs.

At 306, a change notification indicating that a change has been occurred to an application running on a compute node in the computing environment may be generated by a change notification as a service (CNaaS) application using the parsed information. In one example, generating the change notification indicating that the change has been occurred to the application may include generating the change notification indicating that a change has been occurred to an individual component of the application using the parsed information.

In one example, generating the change notification indicating that the change has been occurred to the application may include receiving, by the CNaaS application, the generated alarm from the log analyzer through a notification service. Further, the generated alarm may be transformed into a change notification message by the CNaaS application.

At 308, the change notification identifying the changed application may be sent to a subscriber. In one example, the subscriber may be registered via the CNaaS application for receiving at least one change notification that is desired to be received by the subscriber. In this example, the change notification message may be placed by the CNaaS application on a notification bus for consumption by the subscriber. For example, a subscriber can subscribe for multiple applications and/or multiple subscribers can subscribe for a single application so a mapping of subscribed users to subscribed applications can also be stored in management node. The mapping may provide the capability to identify a list of subscribers to notify when an application or an individual component of the application is changed.

Figure 4:
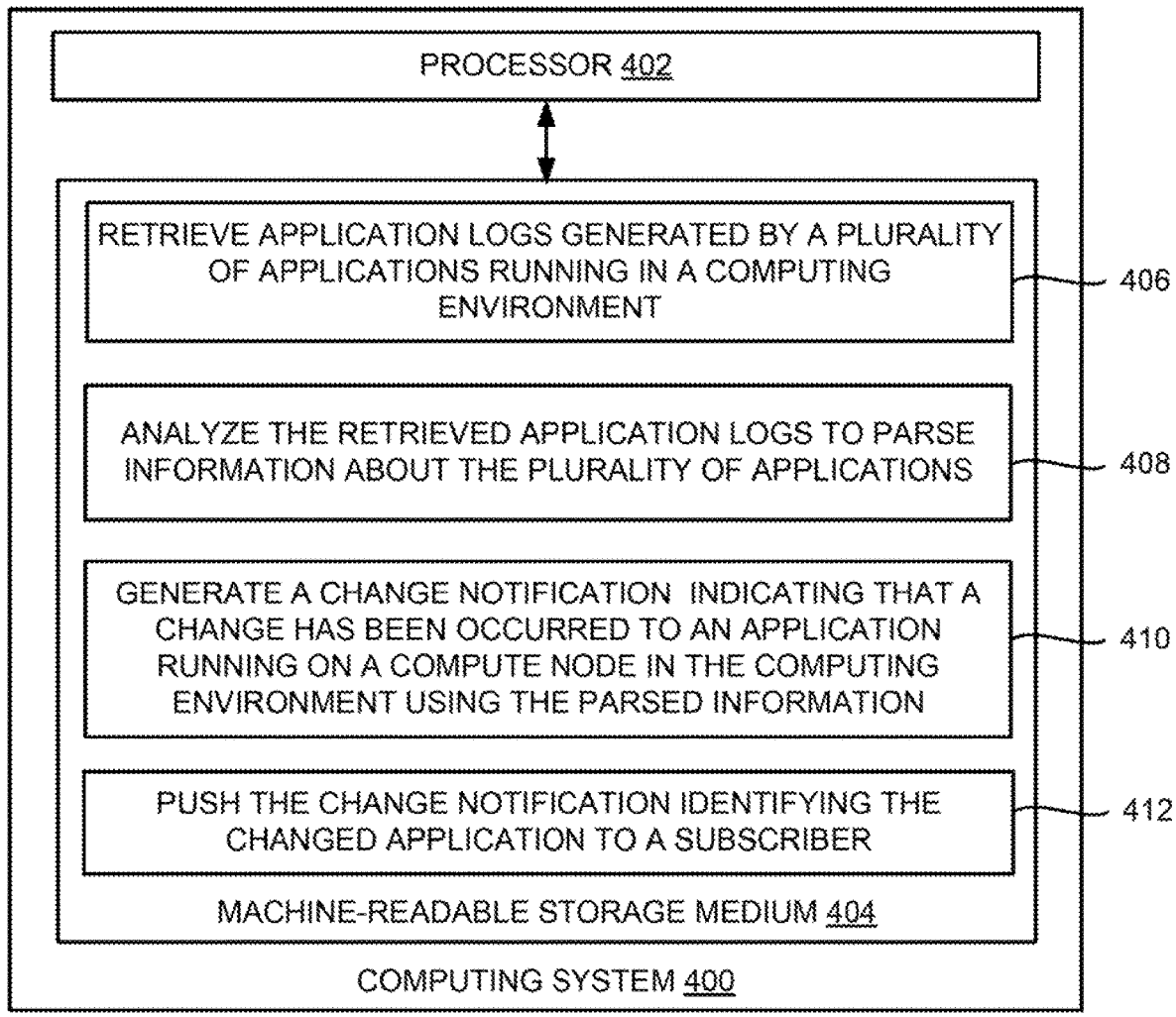
FIG. 4 is a block diagram of an example computing system including non-transitory4 computer-readable storage medium, storing instructions to generate a change notification associated with an application through application logs.

FIG. 4 is a block diagram of an example computing system 400 (e.g., management nodes 104 and 202 of FIGS. 1 and 2, respectively) including non-transitory computer-readable storage medium, storing instructions to generate a change notification associated with an application through application logs. The computing system 400 may include a processor 402 and a machine-readable storage medium 404 communicatively coupled through a system bus. The processor 402 may be any type of central processing unit (CPU), microprocessor, or processing logic that interprets and executes machine-readable instructions stored in the machine-readable storage medium 404. The machine-readable storage medium 404 may be a random-access memory (RAM) or another type of dynamic storage device that may store information and machine-readable instructions that may be executed by the processor 402. For example, the machine-readable storage medium 404 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 404 may be a non-transitory machine-readable medium. In an example, the machine-readable storage medium 404 may be remote but accessible to computing system 400.

The machine-readable storage medium 404 may store instructions 406-412. In an example, instructions 406-412 may be executed by processor 402 for generating the change notification associated with the application through application logs. Instructions 406 may be executed by processor 402 to retrieve application logs generated by a plurality of applications running in a computing environment. Instructions 408 may be executed by processor 402 to analyze the retrieved application logs to parse information about the plurality of applications. Instructions 410 may be executed by processor 402 to generate a change notification indicating that a change has been occurred to an application running on a compute node in the computing environment using the parsed information. Instructions 412 may be executed by processor 402 to push the change notification identifying the changed application to a subscriber.

Further, machine-readable storage medium 404 may include instructions to extract a change associated with an individual component of the application upon receiving the change notification, wherein the change corresponds to one of create, read, update, and delete (CRUD) changes. Furthermore, machine-readable storage medium 404 may include instructions to retrieve data associated with the individual component corresponding to the change and manage the application in the computing environment using the retrieved data.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A system comprising:
a processor; and
memory coupled to the processor, wherein the memory comprises:
a log analyzer to:
receive application logs generated by a plurality of applications running in a computing environment; and
analyze the received application logs to parse information about the plurality of applications, wherein the log analyzer is to analyze the received application logs using context aware log parsing queries to parse information about the plurality of applications; and
a change detection unit communicatively coupled to the log analyzer to:
generate a change notification indicating that a change has been occurred to an application running on a compute node in the computing environment using the parsed information; and
send the change notification indicating that the change has been occurred to the application to a subscriber.

2. The system of claim 1, wherein the log analyzer is to generate an alarm when the parsed information matches with a context aware log parsing query.

3. The system of claim 2, wherein the change detection unit is to:
receive the generated alarm from the log analyzer through a notification service;
transform the generated alarm into a change notification message; and
place the change notification message on a notification bus for consumption by the subscriber.

4. The system of claim 1, wherein the change detection unit is to:
build a notification bus to push the change notification to the subscriber of the notification bus.

5. The system of claim 1, wherein the compute node comprises one of a virtual machine, a container, or a physical machine, and wherein the plurality of applications run in a single cloud or distributed across multiple clouds.

6. The system of claim 1, further comprising:
a log inventory service to index the application logs generated by the plurality of applications, wherein the log analyzer is to receive the indexed application logs from the log inventory service.

7. A system comprising:
a processor; and
memory coupled to the processor, wherein the memory comprises:
a log analyzer to:
receive application logs generated by a plurality of applications running in a computing environment; and
analyze the received application logs to parse information about the plurality of applications;
a change detection unit communicatively coupled to the log analyzer to:
generate a change notification indicating that a change has been occurred to an application running on a compute node in the computing environment using the parsed information; and
send the change notification indicating the changed application to a subscriber; and
an infrastructure management unit to:
extract a change associated with an individual component of the application upon receiving the change notification, wherein the change corresponds to one of create, read, update, and delete (CRUD) changes;
retrieve data associated with the individual component corresponding to the change; and
manage the application in the computing environment using the retrieved data.

8. The system of claim 1, wherein the change detection unit is to generate the change notification indicating that the change has been occurred to an individual component of the application using the parsed information about the plurality of applications.

9. A system comprising:
a processor; and
memory coupled to the processor, wherein the memory comprises:
a log analyzer to:
receive application logs generated by a plurality of applications running in a computing environment; and
analyze the received application logs using an initialization model to parse information about the plurality of applications, wherein the initialization model is trained on input words and/or strings of words using machine learning and natural language processing methods, and wherein the input words and/or the strings of words are selected from historical application logs; and
a change detection unit communicatively coupled to the log analyzer to:
generate a change notification indicating that a change has been occurred to an application running on a compute node in the computing environment using the parsed information; and
send the change notification indicating the changed application to a subscriber.

10. A method comprising:
receiving, by a log analyzer, application logs generated by a plurality of applications running in a computing environment;
analyzing, by the log analyzer, the received application logs to parse information about the plurality of applications, wherein the received application logs are analyzed using context aware log parsing queries to parse information about the plurality of applications;
generating, by a change notification as a service (CNaaS) application, a change notification indicating that a change has been occurred to an application running on a compute node in the computing environment using the parsed information; and
sending the change notification indicating that the change has been occurred to the application to a subscriber.

11. The method of claim 10, further comprising:
monitoring and/or managing the application in the computing environment in response to the change notification.

12. The method of claim 10, further comprising:
generating, by the log analyzer, an alarm when the parsed information matches with a context aware log parsing query.

13. The method of claim 12, wherein generating the change notification indicating that the change has been occurred to the application comprises:
receiving, by the CNaaS application, the generated alarm from the log analyzer through a notification service;
transforming, by the CNaaS application, the generated alarm into a change notification message; and
placing, by the CNaaS application, the change notification message on a notification bus for consumption by the subscriber.

14. The method of claim 10, wherein generating the change notification indicating that the change has been occurred to the application comprises:
generating the change notification indicating that the change has been occurred to an individual component of the application using the parsed information.

15. The method of claim 10, comprising:
indexing the application logs generated by the plurality of applications in a log inventory service, wherein the application logs are received by the log analyzer from the log inventory service.

16. The method of claim 10, further comprising:
registering, via the CNaaS application, for at least one change notification that is desired to be received by the subscriber.

17. A method comprising:
receiving, by a log analyzer, application logs generated by a plurality of applications running in a computing environment;
analyzing the received application logs using an initialization model to parse information about the plurality of applications, wherein the initialization model is trained on input words and/or strings of words using machine learning and natural language processing methods, and wherein the input words and/or the strings of words are selected from historical application logs;
generating, by a change notification as a service (CNaaS) application, a change notification indicating that a change has been occurred to an application running on a compute node in the computing environment using the parsed information; and
sending the change notification identifying the changed application to a subscriber.

18. A non-transitory machine-readable storage medium encoded with instructions that, when executed by a management node, cause the management node to:
retrieve application logs generated by a plurality of applications running in a computing environment;
analyze the retrieved application logs to parse information about the plurality of applications, wherein instructions to analyze the retrieved application logs comprise instructions to:
analyze the received application logs using context aware log parsing queries to parse information about the plurality of applications;
generate a change notification indicating that a change has been occurred to an application running on a compute node in the computing environment using the parsed information; and
push the change notification indicating that the change has been occurred to the application to a subscriber.

19. The non-transitory machine-readable storage medium of claim 18, further comprising instructions to:
generate an alarm when the parsed information matches with a context aware log parsing query.

20. The non-transitory machine-readable storage medium of claim 19, wherein instructions to generate the change notification comprises instructions to:
receive the generated alarm from the log analyzer through a notification service;
process the generated alarm to transform the generated alarm into a change notification message; and
place the change notification message on a notification bus for consumption by the subscriber.

21. A non-transitory machine-readable storage medium encoded with instructions that, when executed by a management node, cause the management node to:
retrieve application logs generated by a plurality of applications running in a computing environment;
analyze the retrieved application logs to parse information about the plurality of applications;
generate a change notification indicating that a change has been occurred to an application running on a compute node in the computing environment using the parsed information;
push the change notification identifying the changed application to a subscriber;
extract a change associated with an individual component of the application upon receiving the change notification, wherein the change corresponds to one of create, read, update, and delete (CRUD) changes;
retrieve data associated with the individual component corresponding to the change; and
manage the application in the computing environment using the retrieved data.

* * * * *